US012326329B2

(12) United States Patent
Oota (10) Patent No.: US 12,326,329 B2
(45) Date of Patent: Jun. 10, 2025

(54) THREE-DIMENSIONAL MEASURING DEVICE, AND THREE- DIMENSIONAL MEASURINGMETHOD (71) Applicant: FANUC CORPORATION, Yamanashi (JP)

(72) Inventor: Yuusuke Oota, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 321 days.

(21) Appl. No.: 17/801,343

(22) PCT Filed: Mar. 1, 2021

(86) PCT No.: PCT/JP2021/007731
§ 371 (c)(1),
(2) Date: Aug. 22, 2022

(87) PCT Pub. No.: WO2021/177236
PCT Pub. Date: Sep. 10, 2021

(65) Prior Publication Data
US 2023/0083531 A1    Mar. 16, 2023

(30) Foreign Application Priority Data
Mar. 5, 2020    (JP) .................. 2020-037898

(51) Int. Cl.
*G06K 9/00*    (2022.01)
*G01B 11/02*    (2006.01)
(Continued)

(52) U.S. Cl.
CPC ............ *G01B 11/24* (2013.01); *G01B 11/026* (2013.01); *G06T 7/50* (2017.01); *G06T 7/593* (2017.01);
(Continued)

(58) Field of Classification Search
CPC ....... G06T 7/00; G06T 7/0002; G06T 7/0004; G06T 7/50; G06T 7/521; G06T 7/55;
(Continued)

(56) References Cited

U.S. PATENT DOCUMENTS 6,606,788 B1 * 8/2003 Morimoto .......... H05K 13/0813
29/827
8,929,608 B2 * 1/2015 Takizawa .................. G06T 7/74
382/106
(Continued)

FOREIGN PATENT DOCUMENTS

JP    2-181880    7/1990
JP    11-252587   9/1999
(Continued)

OTHER PUBLICATIONS

International Search Report issued May 11, 2021 in corresponding International Application No. PCT/JP2021/007731.

*Primary Examiner* — Eric Rush
(74) *Attorney, Agent, or Firm* — Wenderoth, Lind & Ponack, L.L.P.

(57)    ABSTRACT

The objective of the present invention is to appropriately set a distance range for calculating a gradation degree, in accordance with the height of a workpiece. This three-dimensional measuring device is provided with: a three-dimensional sensor which images a workpiece to acquire three-dimensional information; a setting unit which, on the basis of the acquired three-dimensional information, sets a reference position serving as a height direction reference in the workpiece, and a height direction margin, relative to the reference position, for a gradation degree of a gradation image, and sets a distance range corresponding to the gradation degree of the gradation image; an image converting unit which converts the acquired three-dimensional information into the gradation image on the basis of the
(Continued)

distance range; and a detecting unit which employs the gradation image to obtain, three-dimensionally, the shape and/or the position and attitude of the workpiece.

6 Claims, 11 Drawing Sheets

(51) Int. Cl.
*G01B 11/24* (2006.01)
*G06T 7/50* (2017.01)
*G06T 7/593* (2017.01)
*G06V 10/25* (2022.01)

(52) U.S. Cl.
CPC .... *G06V 10/25* (2022.01); *G06T 2207/10028* (2013.01); *G06T 2207/30108* (2013.01); *G06T 2207/30164* (2013.01); *G06V 2201/12* (2022.01)

(58) Field of Classification Search
CPC   G06T 7/593; G06T 7/596; G06T 7/60; G06T 7/62; G06T 7/70; G06T 7/97; G06T 2207/10028; G06T 2207/20092; G06T 2207/20101; G06T 2207/20104; G06T 2207/20228; G06T 2207/30108; G06T 2207/30141; G06T 2207/30148; G06T 2207/30152; G06T 2207/30164; G06V 10/10; G06V 10/20; G06V 10/25; G06V 10/28; G06V 2201/06; G06V 2201/12; G01B 11/02; G01B 11/026; G01B 11/06; G01B 11/0608; G01B 11/16; G01B 11/22; G01B 11/24; G01B 11/25; G01B 11/2545; G01B 11/30; G01B 11/303; G01B 11/306; B25J 9/1697; G05B 2219/37425; G05B 2219/37567; G05B 2219/37555; G05B 2219/40053; G05B 2219/40555; G05B 2219/40557; G05B 2219/40564; G01N 21/88; G01N 21/8803; G01N 21/8851; G01N 21/95; G01N 21/9501; G01N 21/9515; G01N 21/952; G01N 21/956
USPC ................ 382/100, 101, 103, 106, 141–154, 382/168–173, 203, 291, 325; 348/86, 87, 348/90–95, 125–130, 135–137, 141; 356/3, 4.01, 4.07, 4.08, 237.1, 600–603, 356/614, 615, 625, 627, 628, 630, 631; 700/56–59, 95–98, 117, 186, 213, 214, 700/245, 251, 252, 258, 259; 702/1, 702/33–36, 94, 95, 97, 127, 128, 702/150–156, 158, 166, 167, 170–172, 702/179, 180

See application file for complete search history.

(56) References Cited

U.S. PATENT DOCUMENTS

| | | | |
|---|---|---|---|
| 9,536,295 B2* | 1/2017 | Saeki | G06T 7/0004 |
| 10,724,850 B2* | 7/2020 | Fujiwara | G06T 7/70 |
| 2008/0240511 A1* | 10/2008 | Ban | G06T 7/77 |
| | | | 382/108 |
| 2010/0239124 A1* | 9/2010 | Hazeyama | G06T 7/11 |
| | | | 382/103 |
| 2015/0022637 A1* | 1/2015 | Saeki | G06T 7/0004 |
| | | | 348/46 |
| 2019/0033067 A1* | 1/2019 | Yamagami | G01B 11/2513 |

FOREIGN PATENT DOCUMENTS

| | | |
|---|---|---|
| JP | 2008-246631 | 10/2008 |
| JP | 2012-21909 | 2/2012 |
| JP | 2014-240800 | 12/2014 |
| JP | 2015-38466 | 2/2015 |
| JP | 2015-45587 | 3/2015 |
| JP | 2017-10327 | 1/2017 |
| WO | 2009/028489 | 3/2009 |

* cited by examiner

FIG. 11
THREE-DIMENSIONAL MEASURING DEVICE, AND THREE- DIMENSIONAL MEASURINGMETHOD

TECHNICAL FIELD

The present invention relates to a three-dimensional measuring device and a three-dimensional measuring method.

BACKGROUND ART

The shape and the position and posture of a workpiece can be three-dimensionally obtained by processing the three-dimensional information acquired by capturing an image of the workpiece using a three-dimensional sensor such as a stereo camera. However, the object recognition using the three-dimensional information involves a large amount of calculation and takes time for processing. For example, to detect a workpiece on a basis of a model indicative of the three-dimensional shape of the workpiece taught in advance, the three-dimensional information and the model need to be compared to each other, which requires enormous amount of time as compared to the case of the processing of the two-dimensional information.

In this respect, a technology is known in which the detection processing is performed on the basis of the grayscale image obtained by converting, into a grayscale value, a distance value calculated on the basis of the three-dimensional information acquired. For example, see Japanese Unexamined Patent Application, Publication No. 2012-021909.

Patent Document 1: Japanese Unexamined Patent Application, Publication No. 2012-021909

DISCLOSURE OF THE INVENTION

Problems to be Solved by the Invention

In the grayscale image of distance values calculated on the basis of the three-dimensional information acquired from the three-dimensional sensor, a grayscale value varies depending on the height of the workpiece. For example, in the case where the grayscale values for the grayscale image have 256 gradations, a distance corresponding to each of a grayscale value "0" indicating black and a grayscale value "255" indicating white is set in advance on the basis of the distance from a plane perpendicular to an optical axis of the three-dimensional sensor, and the grayscale value varies in a range of the distance depending on a distance. Therefore, the grayscale value may exceed the above-described range of the distance depending on the size of the workpiece.

Figure 10:
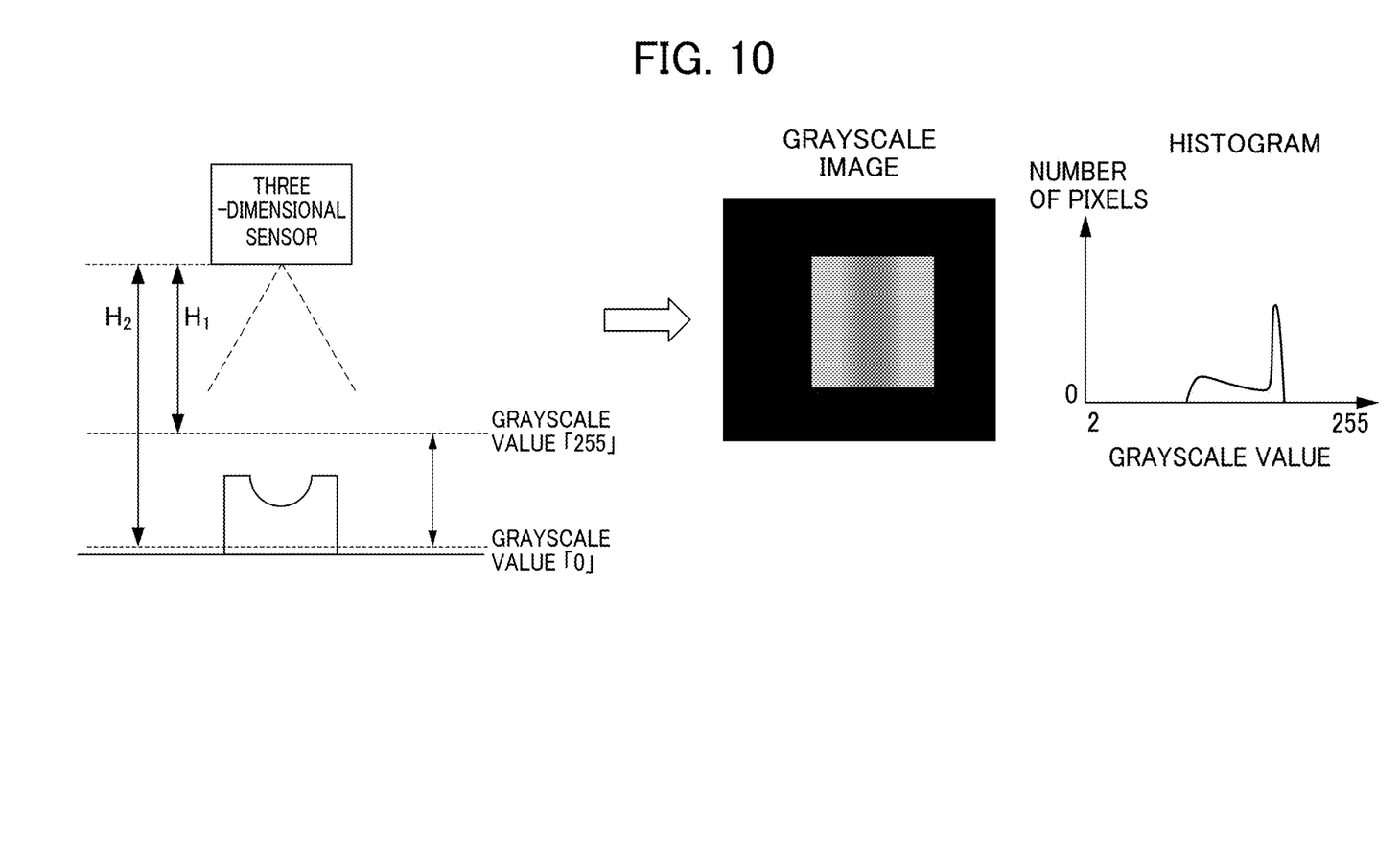
FIG. 10 is a diagram illustrating one example of a grayscale image of a workpiece having a size falling within a range of the distance which is set with reference to the three-dimensional sensor, and one example of a histogram in which the horizontal axis represents a grayscale value and the vertical axis represents the number of pixels.
Figure 11:
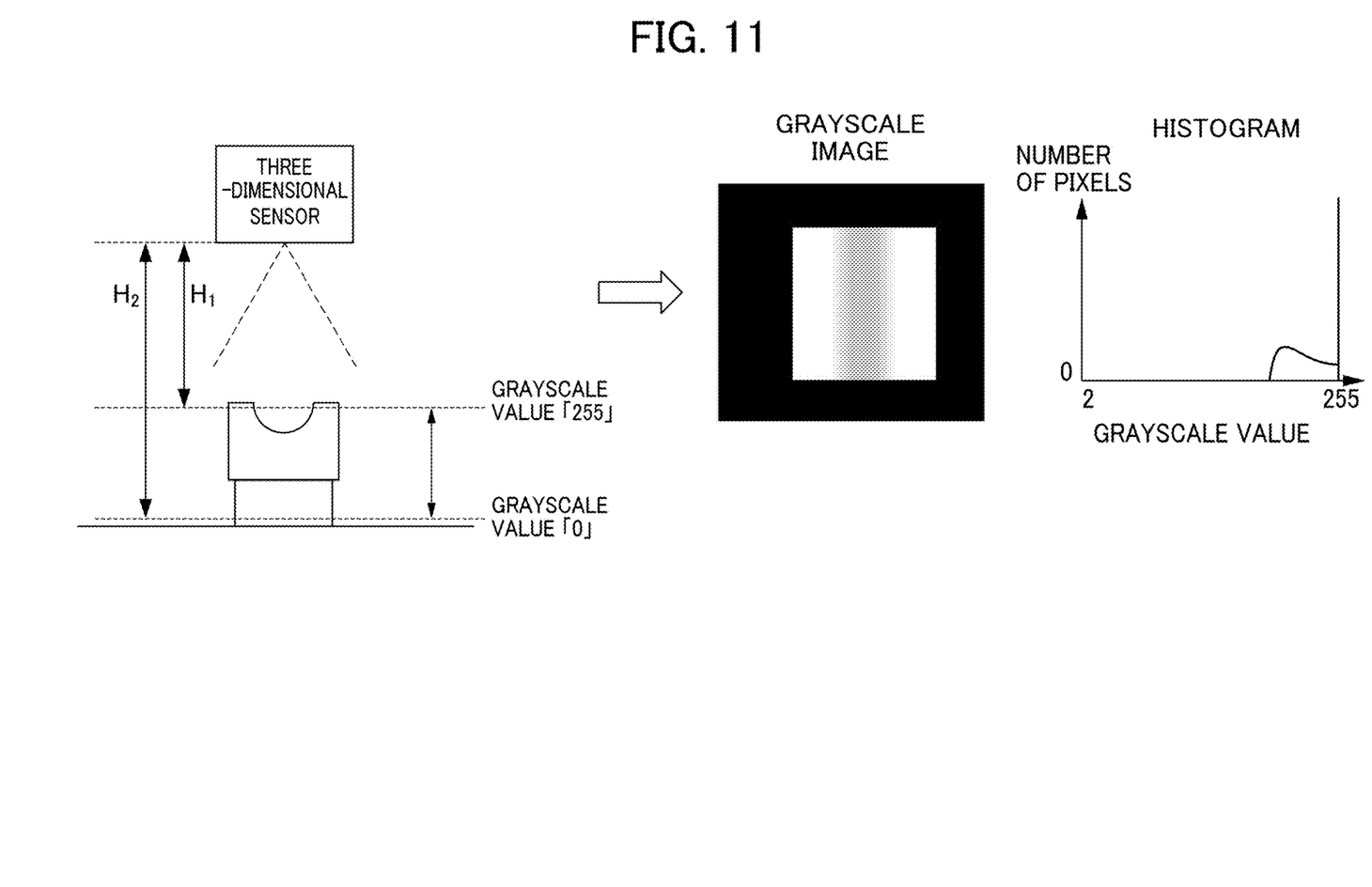
FIG. 11 is a diagram illustrating one example of a grayscale image of a workpiece having a size not falling within a range of the distance which is set with reference to the three-dimensional sensor, and one example of a histogram in which the horizontal axis represents a grayscale value and the vertical axis represents the number of pixels.

FIG. 10 is a diagram illustrating one example of a grayscale image of a workpiece having a size falling within a range of the distance which is set with reference to the three-dimensional sensor, and one example of a histogram in which the horizontal axis represents a grayscale value and the vertical axis represents the number of pixels. FIG. 11 is a diagram illustrating one example of a grayscale image of a workpiece having a size not falling within a range of the distance which is set with reference to the three-dimensional sensor, and one example of a histogram in which the horizontal axis represents a grayscale value and the vertical axis represents the number of pixels. Note that in FIGS. 10 and 11, the grayscale value "255" of white is set at a position away from the three-dimensional sensor by a distance $H_1$, and the grayscale value "0" of black is set at a position away from the three-dimensional sensor by a distance $H_2$. FIG. 10 illustrates a workpiece having a groove formed in a semi-circular shape in the Y-axis direction. FIG. 11 illustrates a workpiece having the same semi-circular groove as that of the workpiece in FIG. 10, and having a height in the Z-axis direction higher than that of the workpiece in FIG. 10.

Since, as illustrated in FIG. 10, the height of the workpiece falls within a range from the distance $H_1$ to the distance $H_2$, the grayscale image reflecting the shape of the workpiece can be obtained. The right side of FIG. 10 illustrates the histogram of the grayscale value in a zone of the workpiece obtained by excluding a background portion (e.g., a zone of a table on which the workpiece is placed) with a grayscale value of "1" or less from the grayscale image.

On the other hand, since, as illustrated in FIG. 11, the upper surface of the workpiece protrudes toward the three-dimensional sensor side from the distance $H_1$, the grayscale image in which clipped whites have occurred on a zone wider than the upper surface of the workpiece is obtained. Therefore, the shape of the workpiece is not correctly reflected in the obtained grayscale image. In the histogram on the right side of FIG. 11, the number of pixels at the grayscale value "255" is increased due to clipped whites.

In this way, since the histogram greatly varies depending on the height of the workpiece even in the same workpiece surface, the histogram cannot be directly compared with a histogram for the model taught in advance, which may complicate the processing.

Therefore, it is desirable to appropriately set a distance range for calculating a gradation level according to the height of the workpiece.

Means for Solving the Problems (1) One aspect of a three-dimensional measuring device of the present disclosure comprises a three-dimensional sensor configured to capture an image of a workpiece and acquire three-dimensional information, a setting unit configured to set a reference position defined as a reference in a height direction in the workpiece on a basis of the three-dimensional information acquired, and a margin in the height direction of a gradation level in a gradation image, the margin being set with reference to the reference position, and set a distance range corresponding to the gradation level of the gradation image, an image conversion unit configured to convert the three-dimensional information acquired into the gradation image on the basis of the distance range, and a detection unit configured to three-dimensionally obtain a shape and/or a position and posture of the workpiece using the gradation image.

(2) One aspect of a three-dimensional measuring method of the present disclosure comprises causing a three-dimensional sensor to capture an image of a workpiece and acquire three-dimensional information, setting a reference position defined as a reference in a height direction in the workpiece on a basis of the three-dimensional information acquired, and a margin in the height direction of a gradation level in a gradation image, the margin being set with reference to the reference position, and set a distance range corresponding to the gradation level of the gradation image, converting the three-dimensional information acquired into the gradation image on the basis of the distance range, and three-dimensionally obtaining a shape and/or a position and posture of the workpiece using the gradation image.

Effects of the Invention

According to one aspect, a distance range for calculating a gradation level according to the height of the workpiece can be appropriately set.

PREFERRED MODE FOR CARRYING OUT THE INVENTION

Hereinafter, an embodiment according to the present invention will be described in detail with reference to the drawings. Here, a black-and-white grayscale image is exemplified as a gradation image. Note that the present invention is not limited to the black-and-white grayscale image, and is also applicable to the grayscale image with the gradation of any color of red, green and blue, for example.

Figure 1:
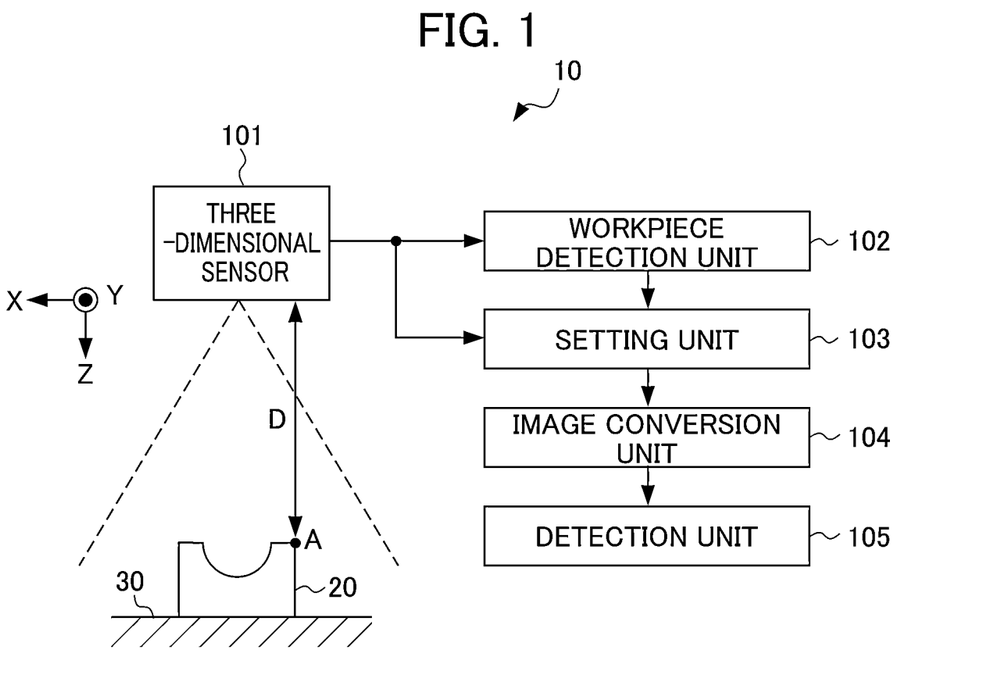
FIG. 1 is a block diagram illustrating one configuration example of a three-dimensional measuring device according to one embodiment.

FIG. 1 is a block diagram illustrating a configuration example of a three-dimensional measuring device according to one embodiment.

As illustrated in FIG. 1, a three-dimensional measuring device 10 includes a three-dimensional sensor 101, a workpiece detection unit 102, a setting unit 103, an image conversion unit 104, and a detection unit 105.

As illustrated in FIG. 1, the three-dimensional sensor 101 captures an image of a workpiece 20 and a placement face 30 on which the workpiece 20 is to be placed, and acquires three-dimensional information including, as a pixel value, a distance between a plane perpendicular to an optical axis of the three-dimensional sensor 101 and each point on surfaces of the workpiece 20 and the placement face 30. For example, as illustrated in FIG. 1, a pixel value at a point A of the workpiece 20 of the three-dimensional information represents a distance D between the three-dimensional sensor 101 and the point A of the workpiece 20 in the Z-axis direction of the three-dimensional coordinate system (X, Y, Z) of the three-dimensional sensor 101. The Z-axis direction of the three-dimensional coordinate system corresponds to an optical axis direction of the three-dimensional sensor 101. In the following description, the distance refers to a distance in the Z-axis direction of the three-dimensional coordinate system (X, Y, Z) of the three-dimensional sensor 101.

The three-dimensional sensor 101 may acquire a two-dimensional image such as an RGB image together with the three-dimensional information.

The workpiece 20 is an object to be detected. The placement face 30 is, for example, a surface of a table on which the workpiece 20 is to be placed. As illustrated in FIG. 1, the workpiece 20 is disposed on the optical axis of the three-dimensional sensor 101. Here, the workpiece 20 is, for example, a rectangular parallelepiped-shaped object having a semi-circular groove formed in the Y-axis direction.

Examples of the three-dimensional sensor 101 may include a stereo camera configured to measure a distance to the workpiece 20 to be detected by matching between images of two cameras, and a stereo camera configured to measure a distance to the workpiece 20 to be detected by matching between an image of a pattern projected from a projector and an image of a camera. As the three-dimensional sensor 101, there may be used a stereo camera configured to measure a distance to the workpiece 20 to be detected by matching between images of the two cameras on the condition that the pattern is projected from the projector.

The workpiece detection unit 102 performs the pattern matching or the like, for example, on the basis of the two-dimensional image acquired by the three-dimensional sensor 101 and the two-dimensional model indicative of the shape of the workpiece 20 stored in advance in a storage unit (unillustrated) such as a hard disk drive (HDD) included in the three-dimensional measuring device 10, and detects a position of the workpiece 20.

Note that the workpiece detection unit 102 may detect a position of the workpiece 20 by the pattern matching or the like based on the three-dimensional information acquired by the three-dimensional sensor 101 and the three-dimensional information indicative of the shape of the workpiece 20 stored in advance in the storage unit (unillustrated) of the three-dimensional measuring device 10, for example.

The setting unit 103 sets a reference position defined as a reference in a height direction (Z-axis direction) in the workpiece 20, and sets a predetermined distance range including the reference position in the Z-axis direction, on the basis of the three-dimensional information acquired by the three-dimensional sensor 101 and the position of the workpiece 20 detected by the workpiece detection unit 102.

Figure 2:
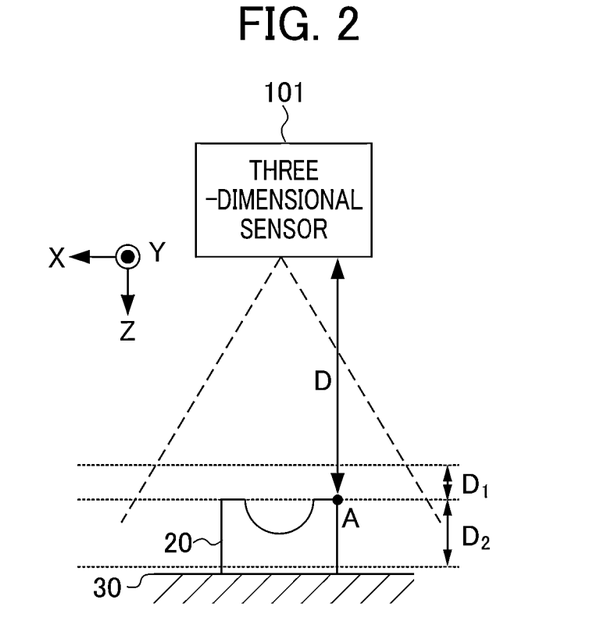
FIG. 2 is a diagram illustrating one example of a reference position and a distance range.

Specifically, the setting unit 103 sets, as a reference position defined as a reference in the Z-axis direction, a point at the shortest distance to the three-dimensional sensor 101 among distances in the Z-axis direction from respective points on the surfaces of the workpiece 20 to the three-dimensional sensor 101 in the three-dimensional information, for example. In the case of FIG. 1, since each point on the upper surface of the workpiece 20 has the shortest distance to the three-dimensional sensor 101, the setting unit 103 sets the point A included in the upper surface as a reference position, for example. As illustrated in FIG. 2, the setting unit 103 sets a margin $D_1$ in the Z-axis direction on the three-dimensional sensor 101 side with reference to the set reference position, the margin $D_1$ being as a reference of white in a grayscale image to be converted from the three-dimensional information by the image conversion unit 104, which will be described later, and a margin $D_2$ in the Z-axis direction on the side opposite to the three-dimensional sensor 101 with reference to the set reference position, the margin $D_2$ being as a reference of black in the grayscale image. In other words, as illustrated in FIG. 3, the setting unit 103 sets grayscale values from "255" to "0" in the distance range from the distance $(D-D_1)$ to the distance $(D+D_2)$ including the reference position in the Z-axis direction.

The image conversion unit 104 converts a distance value at each point on the surface of the workpiece 20 in the three-dimensional information into a grayscale image in which the distance value is converted into a grayscale value, on the basis of the grayscale values in the distance range from the distance $(D-D_1)$ to the distance $(D+D_2)$, the grayscale values being set by the setting unit 103.

Figure 3:
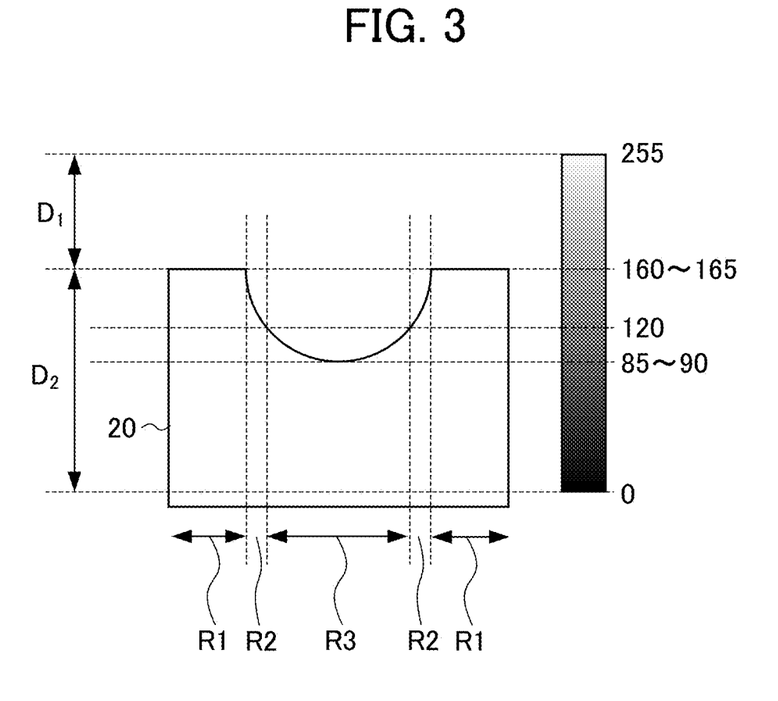
FIG. 3 is a diagram illustrating one example of a relationship among a workpiece, a distance range, and a grayscale value.
Figure 4A:
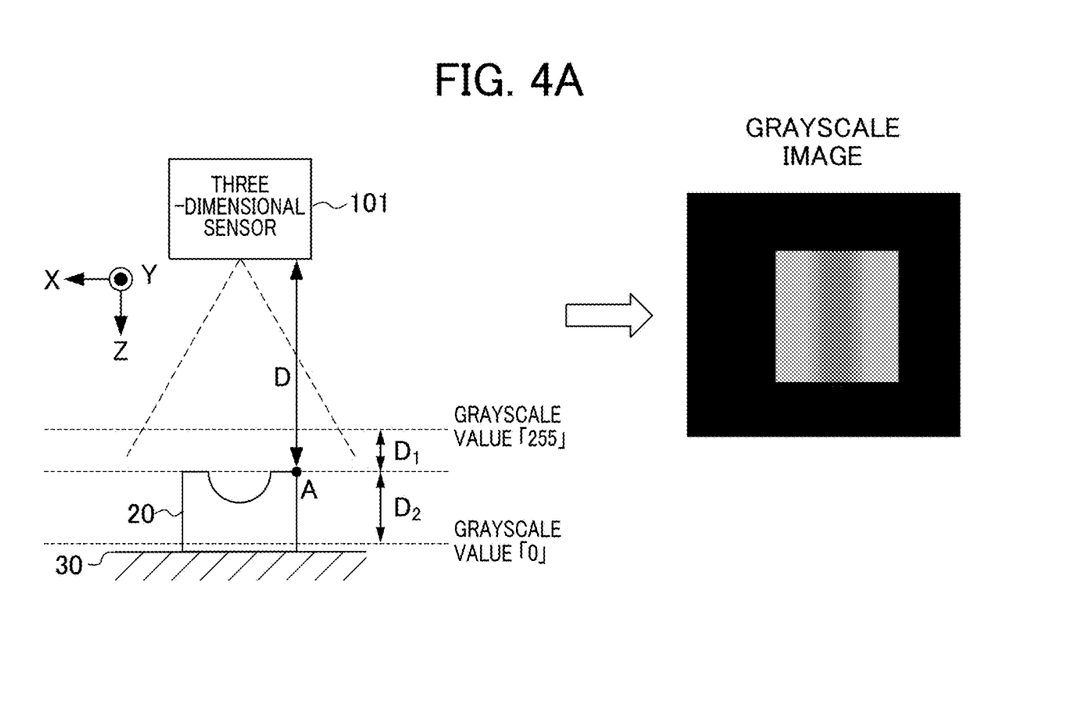
FIG. 4A is a diagram illustrating one example of a grayscale image of a workpiece.

Specifically, for example, as illustrated in FIG. 4A, the image conversion unit 104 converts the three-dimensional information of the workpiece 20 having the same shape as that illustrated in FIG. 10 into the grayscale image with 256 gradations, on the basis of the gradation values set as illustrated in FIG. 3.

Figure 4B:
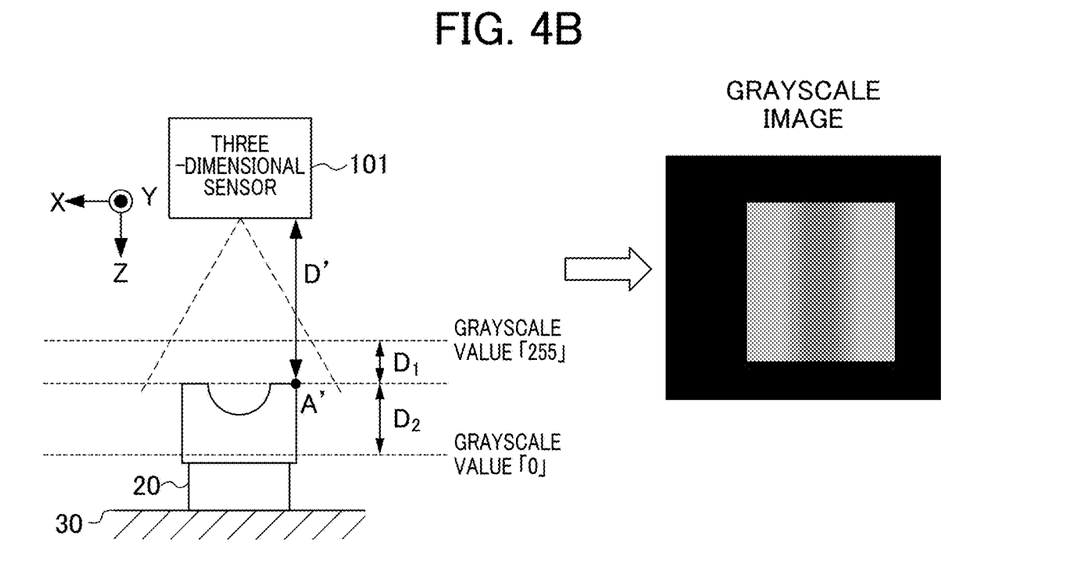
FIG. 4B is a diagram illustrating one example of a grayscale image of a workpiece.

In this way, even when the workpiece 20 has the same shape as that illustrated in FIG. 11, the setting unit 103 can appropriately set the gradations in the distance range from the distance $(D'-D_1)$ to the distance $(D'+D_2)$ according to the height of the workpiece 20 as illustrated in FIG. 4B. This enables the image conversion unit 104 to convert the three-dimensional image into the grayscale image without clipped whites.

Note that D' is a distance in the Z-axis direction between the three-dimensional sensor 101 and a point A' of the workpiece 20. Since the distance D' in FIG. 4B is shorter than the distance D in FIG. 4A, an image of the workpiece 20 in the grayscale image of FIG. 4B is captured by the three-dimensional sensor 101 so that an image size thereof is larger than that of the workpiece 20 in FIG. 4A.

The detection unit 105 performs image processing with respect to the converted grayscale image, and three-dimensionally obtains the shape and the position and posture of the workpiece 20.

Specifically, the detection unit 105 generates a histogram in which the horizontal axis represents a grayscale value and the vertical axis represents the number of pixels, using the grayscale values in a zone corresponding to the workpiece 20 in the converted grayscale image, for example.

Figure 5:
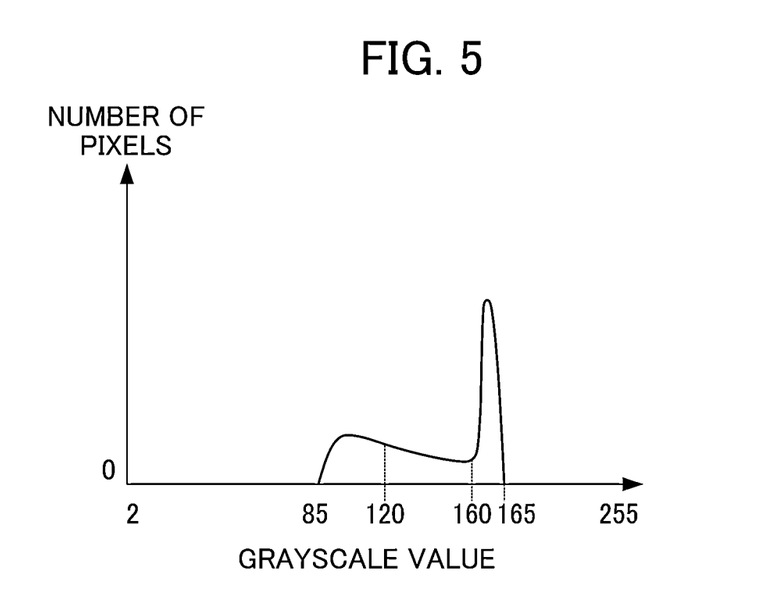
FIG. 5 is a diagram illustrating one example of a histogram for the grayscale image.

FIG. 5 is a diagram illustrating one example of a histogram of the grayscale image in FIG. 4A. Note that FIG. 5 illustrates the histogram of the grayscale value in the workpiece 20 obtained by excluding a background of the placement face 30 with a grayscale value of "1" or less.

Since zones R1 on the upper surface of the workpiece 20 have the largest area as illustrated in FIG. 3, in the histogram, the number of pixels is the largest at the grayscale values from 160 to 165 as illustrated in FIG. 5. In addition, a zone R3 corresponding to a bottom portion of the semi-circular groove has the second largest area, in the histogram, the number of pixels is the second largest at the grayscale values from 85 to 120. On the other hand, since zones R2 corresponding to side surfaces of the semi-circular groove have the smallest area as illustrated in FIG. 3, the number of pixels is the smallest at the grayscale values from 120 to 160.

The detection unit 105 compares the generated histogram in FIG. 5 with a model of the histograms indicating grayscales on the front surface side and the rear surface side of the workpiece 20 stored in advance in the storage unit (unillustrated) of the three-dimensional measuring device 10, determines whether the upper surface of the workpiece 20 placed on the placement face 30 is the front surface side or the rear surface side, and detects an orientation of the workpiece 20.

Figure 6:
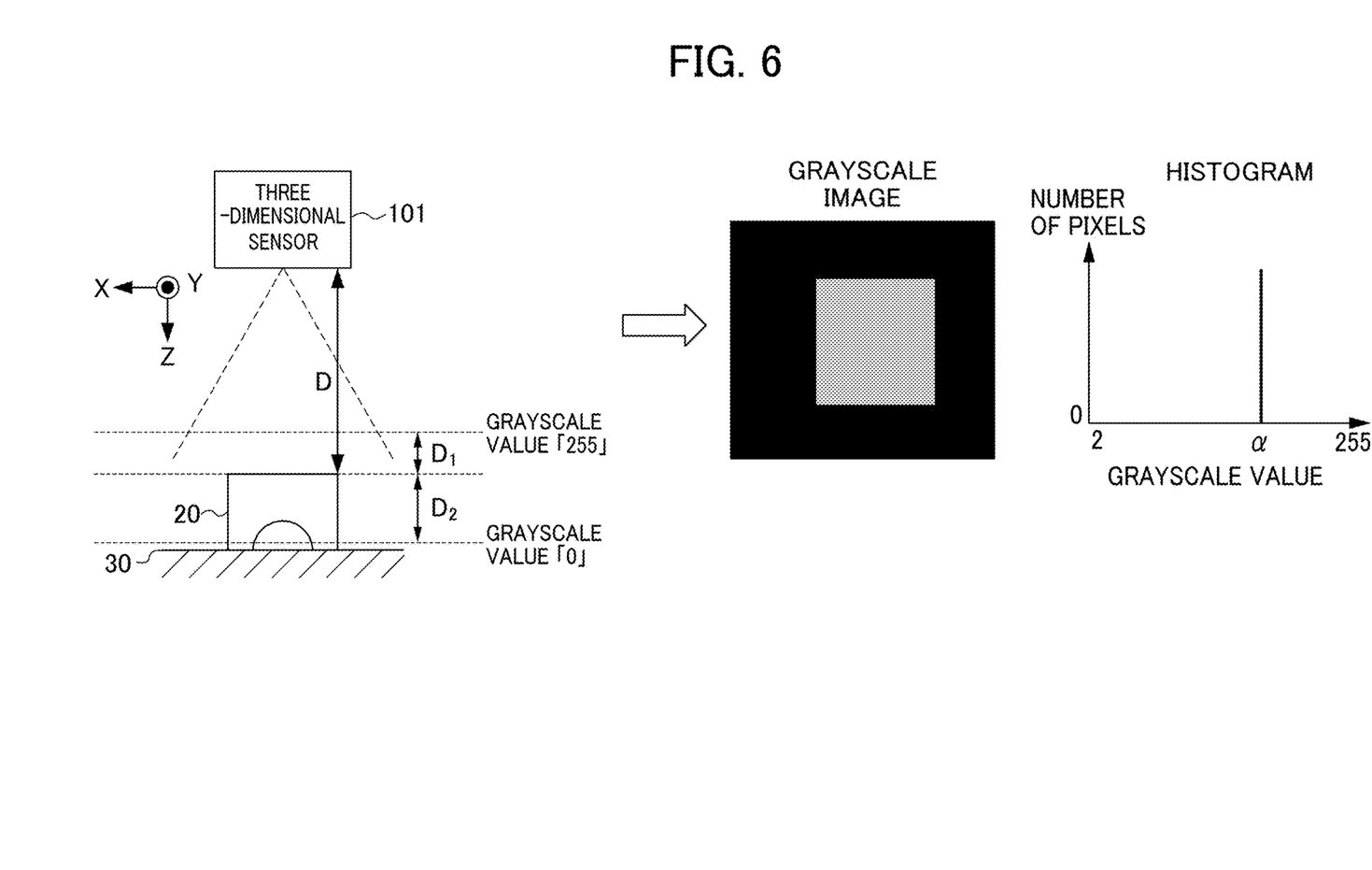
FIG. 6 is a diagram illustrating one example of a grayscale image and a histogram in a case where a rear surface side of the workpiece is disposed as an upper surface thereof.

FIG. 6 is a diagram illustrating one example of a grayscale image and a histogram in the case where the rear surface side of the workpiece 20 is disposed as an upper surface thereof. Note that the left side of FIG. 6 illustrates a positional relationship between the reference position set on the upper surface of the workpiece 20 and each of the margins $D_1$ and $D_2$. In addition, the middle portion of FIG. 6 illustrates a grayscale image of the rear surface side of the workpiece 20. Furthermore, the right side of FIG. 6 illustrates the histogram in which the horizontal axis represents a grayscale value and the vertical axis represents the number of pixels in the rear surface side of the workpiece 20. The histogram of FIG. 6 indicates grayscale values in the workpiece 20 obtained by excluding a background of the placement face 30 with a grayscale value of "1" or less, in the same manner as the case of FIG. 5.

As illustrates in the middle portion of FIG. 6, since the rear surface side of the workpiece 20 is a flat surface with less unevenness, and the grayscale image shows that the grayscale of the image is constant. Therefore, as illustrated in the right side of FIG. 6, in the histogram for the rear surface side of the workpiece 20, only the pixel for the grayscale value a is distributed.

As illustrated in FIG. 4A (or FIG. 4B) and FIG. 6, this results in a large difference in the shape of the histogram between the front side surface and the rear side surface of the workpiece 20, which enables the three-dimensional measuring device 10 to determine whether the upper surface of the workpiece 20 on the placement face 30 is the front surface side or the rear surface side, on the basis of the histogram.

To achieve the functional blocks excluding the three-dimensional sensor 101 and included in the three-dimensional measuring device 10 illustrated in FIG. 1, the three-dimensional measuring device 10 may be configured by a computer including an operation processing unit such as a central processing unit (CPU). The three-dimensional measuring device 10, for example, further includes an auxiliary storage unit such as an HDD that stores programs for various types of control, including application software and an operating system (OS), and a main storage unit such as a random access memory (RAM) for storing data that is temporarily required to cause the operation processing unit to execute the programs.

In the three-dimensional measuring device 10, the operation processing unit then reads the application software and the OS from the auxiliary storage unit, deploys the read application software and OS into the main storage unit, and performs operation processing on the basis of the application software and the OS. On the basis of the result of the operation processing, various types of hardware included in the three-dimensional measuring device 10 are further controlled. In this way, the functional blocks according to the present embodiment are achieved. That is, the present embodiment can be achieved when the hardware and the software cooperate with each other.

<Measurement Process of Three-Dimensional Measuring Device 10>

Next, the operation related to a measurement process of the three-dimensional measuring device 10 according to the present embodiment will be described.

Figure 7:
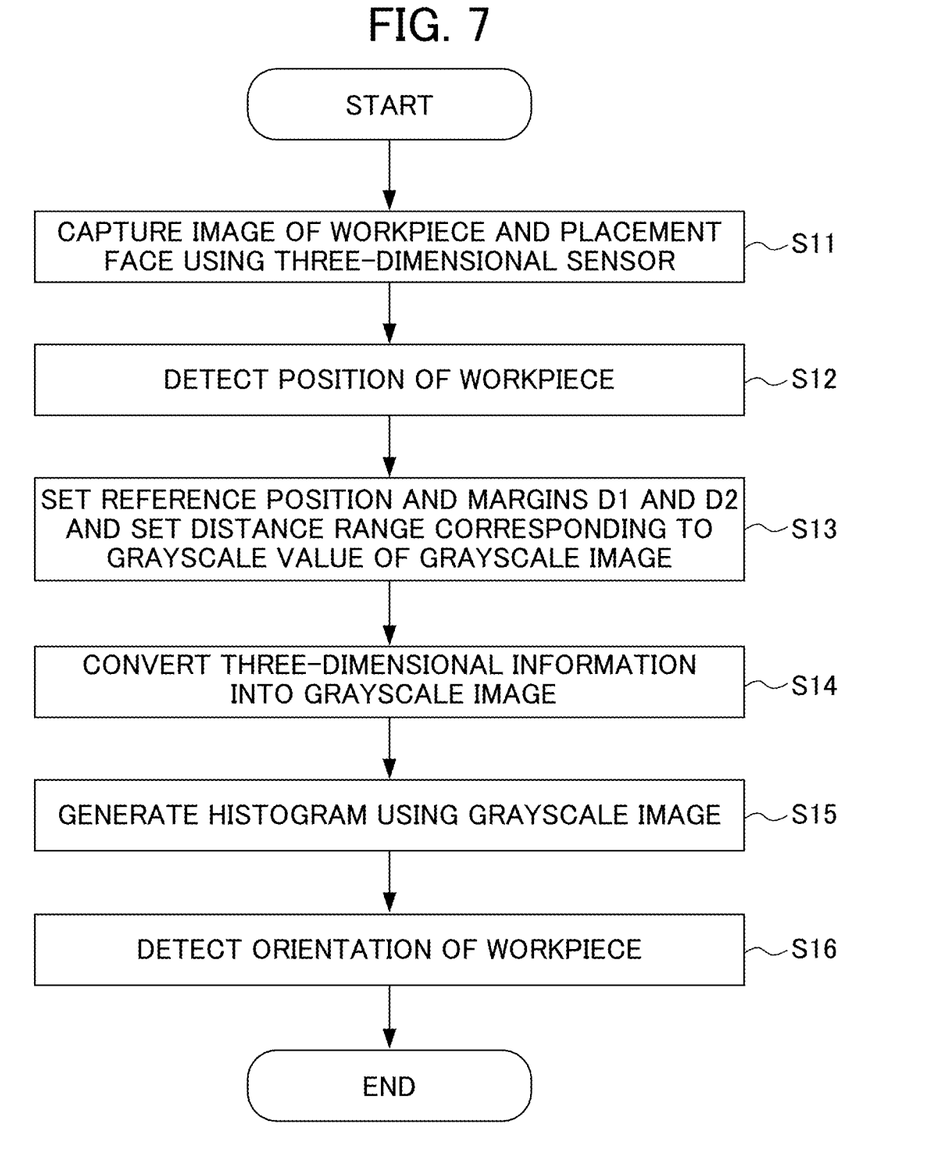
FIG. 7 is a flowchart illustrating a measurement process of a three-dimensional measuring device.

FIG. 7 is a flowchart illustrating the measurement process of the three-dimensional measuring device 10.

In Step S11, the three-dimensional sensor 101 captures an image of the workpiece 20 and the placement face 30 on which the workpiece 20 is to be placed, and acquires the three-dimensional information including, as a pixel value, a distance between the three-dimensional sensor 101 and each point on surfaces of the workpiece 20 and the placement face 30, and the two-dimensional image such as an RGB image. The three-dimensional sensor 101 outputs the two-dimensional image to the workpiece detection unit 102, and outputs the three-dimensional information to the setting unit 103.

In Step S12, the workpiece detection unit 102 detects a position of the workpiece 20 by the pattern matching or the like, on the basis of the two-dimensional image acquired in Step S11, and the two-dimensional model of the workpiece 20 stored in advance in the storage unit (unillustrated) of the three-dimensional measuring device 10.

In Step S13, the setting unit 103 sets a reference position defined as a reference in the Z-axis direction in the workpiece 20, and the margins $D_1$ and $D_2$, on the basis of the three-dimensional information acquired in Step S11 and the position of the workpiece 20 detected in Step S12, and sets a distance range corresponding to a grayscale value of the grayscale image.

In Step S14, the image conversion unit 104 converts the three-dimensional information into the grayscale image, on the basis of the distance range set in Step S13.

In Step S15, the detection unit 105 generates a histogram in which the horizontal axis represents a grayscale value and the vertical axis represents the number of pixels, using the grayscale values in the grayscale image converted in Step S14.

In Step S16, the detection unit 105 compares the histogram generated in Step S15 with a model of the histograms of the grayscale values on the front surface side and the rear surface side of the workpiece 20 stored in advance in the storage unit (unillustrated) of the three-dimensional measuring device 10, determines whether the upper surface of the workpiece 20 placed on the placement face 30 is the front surface side or the rear surface side, and detects an orientation of the workpiece 20.

As described above, the three-dimensional measuring device 10 according to one embodiment acquires the three-dimensional information including a distance in the Z-axis direction to each point on the surface of the workpiece 20 in the image captured by the three-dimensional sensor 101. The three-dimensional measuring device 10 sets a reference position D defined as a reference in the Z-axis direction in the workpiece 20, and the margins $D_1$ and $D_2$, on the basis of the three-dimensional information acquired, and sets a distance range corresponding to a grayscale value of the grayscale image. This enables the three-dimensional measuring device 10 to appropriately set the distance range for calculating a gradation level according to the height of the workpiece 20 and to convert the three-dimensional information into the grayscale image without clipped whites, in which the distance value is converted into the grayscale value. Since the grayscale value in the grayscale image does not largely change even when the height of the workpiece 20 is changed, the three-dimensional measuring device 10 can determine whether the upper surface of the workpiece 20 is the front surface side or the rear surface side, using the grayscale values in the histogram or the like, and can easily perform the detection processing of detecting the orientation of the workpiece 20.

In the case where a position (height) for gripping the workpiece 20 is changed depending on whether the upper surface is the front surface side or the rear surface side, on the basis of the detection result, for example, the three-dimensional measuring device 10 can confirm whether there is present an object with a height having a possibility of colliding with the periphery of the workpiece 20 when the workpiece 20 is to be picked by a robot.

Although one embodiment has been described above, the three-dimensional measuring device 10 is not limited to the above-described embodiment, and includes modifications, improvements, and the like within the scope which can achieve the object of the present invention.

Modification Example 1

In the above-described embodiment, the three-dimensional measuring device 10 sets the reference position defined as a reference in the Z-axis direction in the workpiece 20 and the margins $D_1$ and $D_2$, but the present invention is not limited thereto. For example, the reference position is set to a point at the shortest distance to the three-dimensional sensor 101 among distances from the respective points on the surfaces of the workpiece 20 in the three-dimensional information, and therefore, the three-dimensional measuring device 10 may set only the margin $D_2$. That is, the three-dimensional measuring device 10 may set grayscale values from "255" to "0" in the distance range from the distance D to the distance (D+$D_2$).

Modification Example 2

For example, in the above-described embodiment, the three-dimensional measuring device 10 determines whether the upper surface of the workpiece 20 is the front surface side or the rear surface side, using the histogram, and detects the orientation of the workpiece 20, but the present invention is not limited thereto. For example, the three-dimensional measuring device 10 may store in advance the model of each posture of the workpiece 20 in the grayscale image in the storage unit (unillustrated), perform the shape comparison (matching) between the converted grayscale image and the stored model of each posture, and obtain the three-dimensional position and posture of the workpiece 20.

Figure 8A:
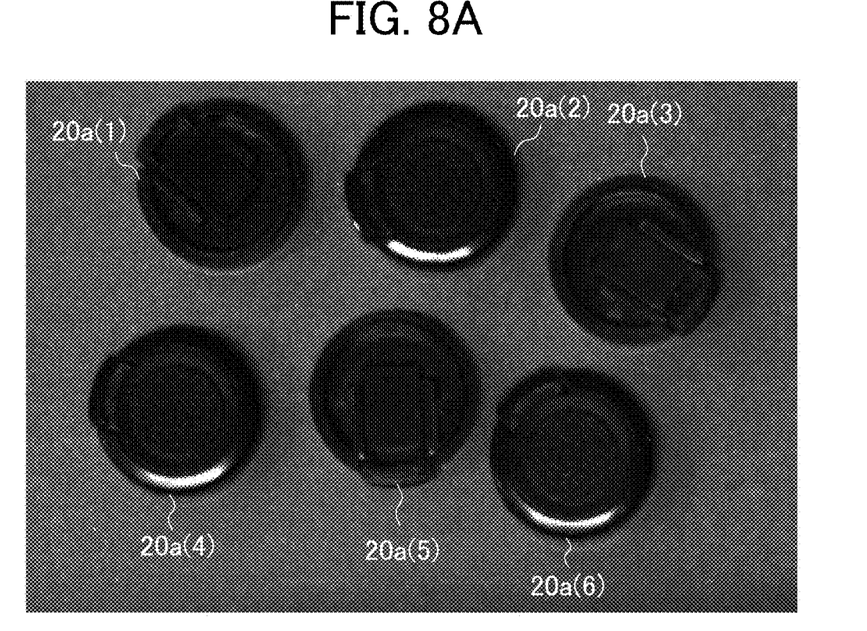
FIG. 8A is a diagram illustrating one example of a two-dimensional image of six workpieces, the image being captured by a three-dimensional sensor.

FIG. 8A is a diagram illustrating one example of a two-dimensional image of six workpieces 20a(1) to 20a(6), the image being captured by a three-dimensional sensor 101. In FIG. 8A, the front surface side of each of the workpieces 20a(1), 20a(3), and 20a(5) serves as the upper surface, and the rear surface side of each of the workpieces 20a(2), 20a(4), and 20a(6) serves as the upper surface.

Figure 8B:
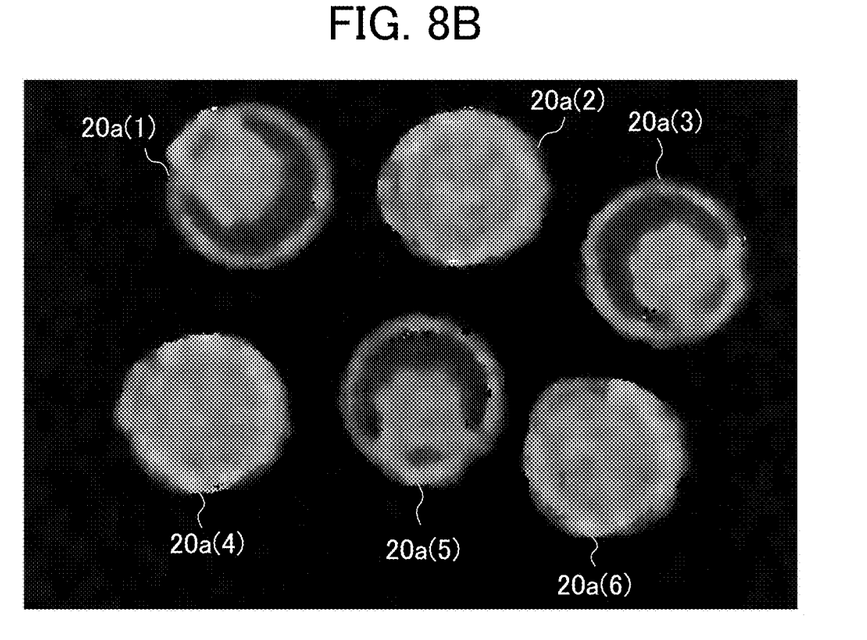
FIG. 8B is a diagram illustrating one example of a grayscale image of a workpiece.

FIG. 8B illustrates the grayscale image of the workpieces 20a(1) to 20a(6) in FIG. 8A.

The three-dimensional measuring device 10 can detect the position and posture (XYZWPR) of each of the workpieces 20a(1) to 20a(6) on the grayscale image by template matching on the basis of the edge of the grayscale image of FIG. 8B, for example.

Figure 9A:
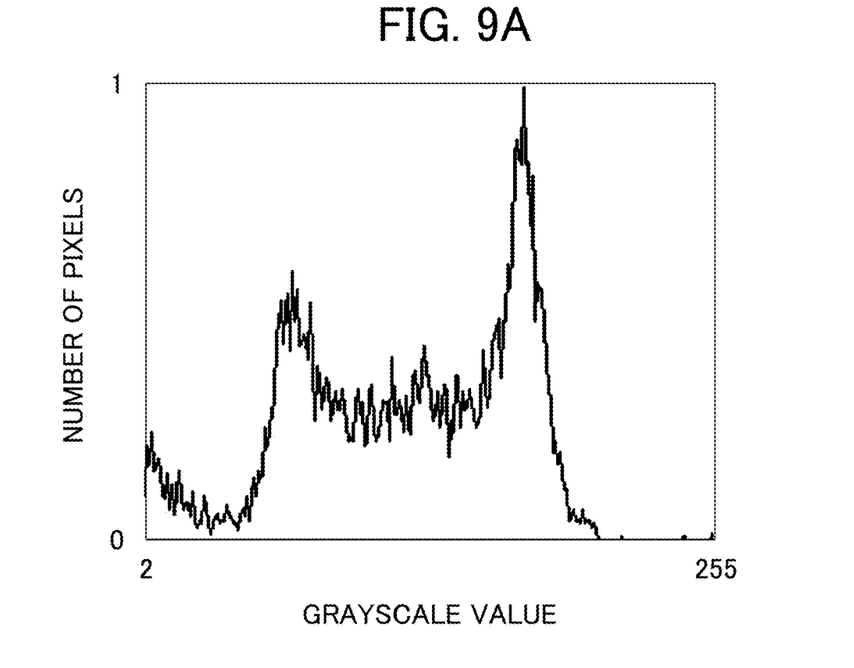
FIG. 9A is a diagram illustrating one example of a histogram for a grayscale image of a front surface side of a workpiece.
Figure 9B:
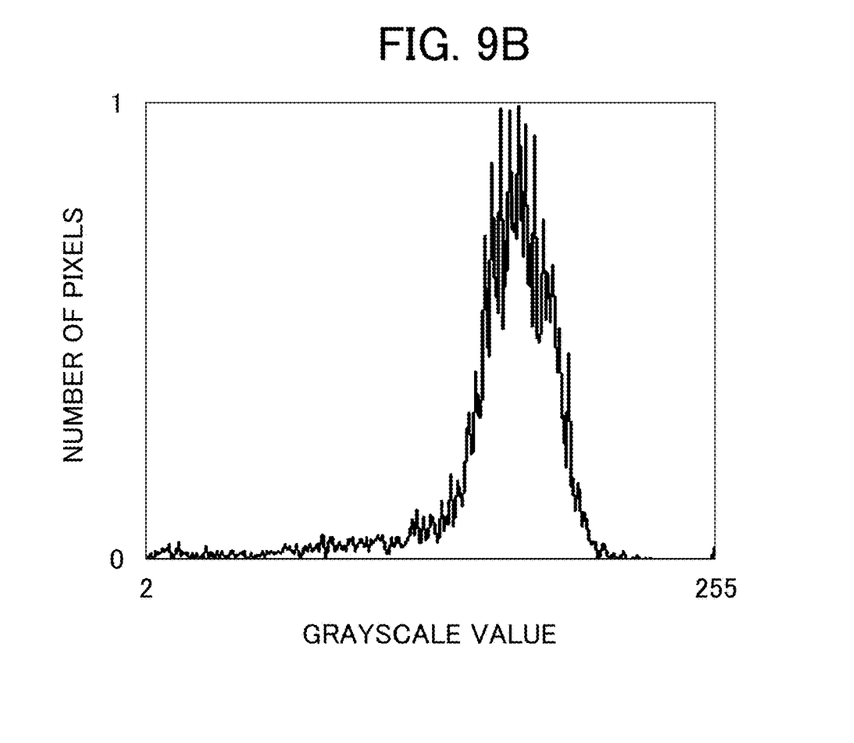
FIG. 9B is a diagram illustrating one example of a histogram for a grayscale image of a rear surface side of a workpiece.

After performing the above-described template matching, the three-dimensional measuring device 10 may determine whether the upper surface of each of the workpieces 20a(1) to 20a(6) is the front surface side or the rear surface side, using the histograms illustrated in FIGS. 9A and 9B, to obtain the more accurate three-dimensional position and posture of the workpiece 20.

FIG. 9A is a diagram illustrating one example of a histogram for the grayscale image of the front surface side of the workpiece 20a(1). FIG. 9B is a diagram illustrating one example of a histogram for the grayscale image of the rear surface side of the workpiece 20a(2). Note that in the histogram illustrated in each of FIGS. 9A and 9B, the background with a grayscale value of "1" or less (i.e., the placement face 30) is excluded. As for the number of pixels in the histogram, the largest number of pixels with respect to the grayscale value is normalized as "1."

Note that the histogram for the front surface side of each of the workpieces 20a(3) and 20a(5) is also the same as the histogram of the workpiece 20a(1) in FIG. 9A. In addition, the histogram for the rear surface side of each of the workpieces 20a(4) and 20a(6) is also the same as the histogram of the workpiece 20a(2) in FIG. 9B.

Although the posture in addition to the orientation can be detected from only the grayscale image, the comparison processing including a change in a rotation (R direction) around the Z-axis is required, which requires a processing time. On the other hand, even when the workpiece is turned in the R direction, the same histograms as those as illustrated in FIGS. 9A and 9B can be obtained. Therefore, as described above, after performing the above-described template matching, the three-dimensional measuring device 10 may obtain the more accurate three-dimensional position and posture of the workpiece 20 using the histograms in a short time.

Modification Example 3

For example, in the above-described embodiment, the gradation image is a black-and-white grayscale image, but the present invention is not limited thereto. For example, the gradation image may be a grayscale image using the gradation of any color of red, green and blue.

Note that each of the functions included in the three-dimensional measuring device 10 in one embodiment can be implemented by hardware, software, or a combination thereof. Here, the implementation by software means that a computer reads and executes a program for implementation.

The program can be stored in various types of non-transitory computer readable media and can be provided to a computer. The non-transitory computer readable media include various types of tangible storage media. Examples of the non-transitory computer readable media include a magnetic recording medium (e.g., a flexible disk, a magnetic tape, a hard disk drive), a magnetic-optical recording medium (e.g., a magnetic optical disk), a read only memory (CD-ROM), a CD-R, a CD-R/W, and a semiconductor memory (e.g., a mask ROM, a programmable ROM (PROM), and erasable PROM (EPROM), a flash ROM, and a RAM). The program may be provided to the computer by way of various types of transitory computer readable media. Examples of the transitory computer readable media include an electrical signal, an optical signal, and an electromagnetic wave. The transitory computer readable medium can provide a program to the computer through a wired communication line, such as a wire and an optical fiber, or through a wireless communication line.

Steps of describing the program to be recorded on a recording medium include not only processes that are executed in time sequence according to the order, but also processes that are executed in parallel or individually and not necessarily in time sequence.

In other words, the three-dimensional measuring device and the three-dimensional measuring method of the present disclosure encompass various embodiments having the following constitutions.

(1) A three-dimensional measuring device 10 of the present disclosure comprises a three-dimensional sensor 101 configured to capture an image of a workpiece 20 and acquire three-dimensional information, a setting unit 103 configured to set a reference position D defined as a reference in a height direction in the workpiece 20 on a basis of the three-dimensional information acquired, and a margin $D_-$, $D_2$ in the height direction of a gradation level in a gradation image, the margin being set with reference to the reference position D, and set a distance range corresponding to the gradation level of the gradation image, an image conversion unit 104 configured to convert the three-dimensional information acquired into the gradation image on the basis of the distance range, and a detection unit 105 configured to three-dimensionally obtain a shape and/or a position and posture of the workpiece 20 using the gradation image.

According to the three-dimensional measuring device 10, a distance range for calculating a gradation level according to the height of the workpiece can be appropriately set.

(2) According to the three-dimensional measuring device 10 according to (1) above, the detection unit 105 may generate a histogram using the gradation level of the gradation image, and three-dimensionally obtain the shape and/or the position and posture of the workpiece 20 on the basis of the generated histogram.

This constitution enables the three-dimensional measuring device 10 to reduce an amount of calculation as compared to the case of using the gradation image.

(3) In the three-dimensional measuring device 10 according to (1) or (2) above, a shape of the workpiece 20 may be a front surface or a rear surface of the workpiece 20.

This constitution enables the three-dimensional measuring device 10 to confirm whether there is present an object with a height having a possibility of colliding with a periphery of the workpiece 20, when the workpiece 20 is to be picked by a robot.

(4) A three-dimensional measuring method of the present disclosure comprises causing a three-dimensional sensor 101 to capture an image of a workpiece 20 and acquire three-dimensional information, setting a reference position D defined as a reference in a height direction in the workpiece 20 on a basis of the three-dimensional information acquired, and a margin $D_1$, $D_2$ in the height direction of a gradation level in a gradation image, the margin being set with reference to the reference position D, and set a distance range corresponding to the gradation level of the gradation image, converting the three-dimensional information acquired into the gradation image on the basis of the distance range, and three-dimensionally obtaining a shape and/or a position and posture of the workpiece 20 using the gradation image.

The three-dimensional measuring method exerts the same effect as that exerted by (1) above.

(5) According to the three-dimensional measuring method according to (4) above, a histogram may be generated using the gradation level of the gradation image, and the shape and/or the position and posture of the workpiece 20 may be three-dimensionally obtained on the basis of the generated histogram.

This constitution exerts the same effect as that exerted by (2) above.

(6) In the three-dimensional measuring method according to (4) or (5) above, a shape of the workpiece 20 may be a front surface or a rear surface of the workpiece 20.

The three-dimensional measuring method exerts the same effect as that exerted by (3) above.

EXPLANATION OF REFERENCE NUMERALS

10 Three-dimensional measuring device
20 Workpiece
30 Placement face
101 Three-dimensional sensor
102 Workpiece detection unit
103 Setting unit
104 Image conversion unit
105 Detection unit

The invention claimed is:

1. A three-dimensional measuring device, comprising:
a three-dimensional sensor configured to capture an image of a workpiece and acquire three-dimensional information;
a setting unit configured to automatically set a reference position that defines as a reference in a height direction a position that is highest on the workpiece based on the three-dimensional information acquired, a first margin in the height direction of a gradation level in a gradation image, and a second margin of the gradation level in the gradation image, the first margin being toward the three-dimensional sensor in the height direction based on the reference position, the second margin being farther away from the three-dimensional sensor in the height direction based on the reference position, and the first margin and the second margin being set with reference to the reference position wherein a distance between the first margin and the reference position is different than a distance between the reference position and the second margin, and automatically set a distance range corresponding to the gradation level of the gradation image based on the first margin and the second margin;
an image conversion unit configured to convert the three-dimensional information acquired into the gradation image on the basis of the distance range; and
a detection unit configured to three-dimensionally obtain a shape or a position and posture of the workpiece using the gradation image.

2. The three-dimensional measuring device according to claim 1, wherein the detection unit generates a histogram using the gradation level of the gradation image, and three-dimensionally obtains the shape or the position and posture of the workpiece on the basis of the generated histogram.

3. The three-dimensional measuring device according to claim 1, wherein the shape of the workpiece is a front surface or a rear surface of the workpiece.

4. A non-transitory computer readable medium configured to store a three-dimensional measuring program for causing a processor to control a three-dimensional measuring device to execute steps of a three-dimensional measuring method, the three-dimensional measuring method comprising:
causing a three-dimensional sensor to capture an image of a workpiece and acquire three-dimensional information;
automatically setting a reference position that defines as a reference in a height direction a position that is highest on the workpiece based on the three-dimensional information acquired, a first margin in the height direction of a gradation level in a gradation image, and a second margin of the gradation level in the gradation image, the first margin being toward the three-dimensional sensor in the height direction based on the reference position, the second margin being farther away from the three-dimensional sensor in the height direction based on the reference position, and the first margin and the second margin being set with reference to the reference position wherein a distance between the first margin and the reference position is different than a distance between the reference position and the second margin, and automatically setting a distance range corresponding to the gradation level of the gradation image based on the first margin and the second margin;
converting the three-dimensional information acquired into the gradation image on the basis of the distance range; and
three-dimensionally obtaining a shape or a position and posture of the workpiece using the gradation image.

5. The non-transitory computer readable medium according to claim 4, wherein the three-dimensional measuring program further causes the processor to control a three-dimensional measuring device to execute generating a histogram is using the gradation level of the gradation image, and
the shape or the position and posture of the workpiece is three-dimensionally obtained on the basis of the generated histogram.

6. The non-transitory computer readable medium to claim 4, wherein the shape of the workpiece is a front surface or a rear surface of the workpiece.

* * * * *